(12) United States Patent
Jonsson

(10) Patent No.: US 11,052,465 B2
(45) Date of Patent: Jul. 6, 2021

(54) TURNING INSERT

(71) Applicant: SECO TOOLS AB, Fagersta (SE)

(72) Inventor: Mats Jonsson, Hedemora (SE)

(73) Assignee: SECO TOOLS AB, Fagersta (SE)

( * ) Notice: Subject to any disclaimer, the term of this patent is extended or adjusted under 35 U.S.C. 154(b) by 118 days.

(21) Appl. No.: 16/342,918

(22) PCT Filed: Oct. 16, 2017

(86) PCT No.: PCT/EP2017/076345
§ 371 (c)(1),
(2) Date: Apr. 17, 2019

(87) PCT Pub. No.: WO2018/073172
PCT Pub. Date: Apr. 26, 2018

(65) Prior Publication Data
US 2020/0038963 A1    Feb. 6, 2020

(30) Foreign Application Priority Data
Oct. 19, 2016    (EP) .................................... 16194608

(51) Int. Cl.
*B23B 27/16*    (2006.01)
*B23B 27/14*    (2006.01)

(52) U.S. Cl.
CPC ........ *B23B 27/141* (2013.01); *B23B 27/1655* (2013.01); *B23B 2200/087* (2013.01); *B23B 2200/201* (2013.01); *B23B 2200/202* (2013.01); *B23B 2200/208* (2013.01)

(58) Field of Classification Search
CPC ......... B23B 27/14; B23B 27/16; B23B 27/18; B23B 27/20; B23B 27/22; B23B 27/141; B23B 27/1613; B23B 27/1622; B23B 2200/0433; B23B 2200/083; B23B 2200/085; B23B 2200/286
See application file for complete search history.

(56) References Cited

U.S. PATENT DOCUMENTS

| | | | | |
|---|---|---|---|---|
| 3,395,434 A | * | 8/1968 | Olof | C08F 4/7095 407/114 |
| 3,781,956 A | * | 1/1974 | Jones | B23B 27/143 407/113 |
| 4,681,487 A | | 7/1987 | Pettersson | |
| 5,215,415 A | * | 6/1993 | Fukuoka | B23B 27/143 407/114 |
| 5,456,557 A | * | 10/1995 | Bernadic | B23B 27/143 407/114 |
| 5,584,616 A | * | 12/1996 | Katbi | B23B 27/143 407/114 |
| 6,234,726 B1 | * | 5/2001 | Okada | B23B 27/143 407/114 |

(Continued)

FOREIGN PATENT DOCUMENTS

| | | |
|---|---|---|
| EP | 0447847 A1 | 9/1991 |
| EP | 1850992 B1 | 10/2009 |

(Continued)

*Primary Examiner* — Nicole N Ramos
(74) *Attorney, Agent, or Firm* — Corinne R. Gorski

(57) ABSTRACT

A turning insert arranged for longitudinal turning of metal work pieces includes a nose cutting edge that slopes from a trailing cutting edge in direction towards a leading cutting edge. A turning tool is also disclosed.

15 Claims, 7 Drawing Sheets

(56) References Cited

U.S. PATENT DOCUMENTS

| | | |
|---|---|---|
| 6,241,430 B1 | 6/2001 | Norstrom |
| 2006/0188347 A1 | 8/2006 | Kratz |
| 2007/0056413 A1* | 3/2007 | Krenzer ............ B23B 29/03403 82/1.11 |
| 2010/0183386 A1* | 7/2010 | Heinloth ................... B23B 5/18 407/113 |
| 2012/0128438 A1* | 5/2012 | Tanaka .................. B23B 27/141 407/115 |

FOREIGN PATENT DOCUMENTS

| | | |
|---|---|---|
| EP | 2774705 A1 | 9/2014 |
| EP | 2781286 A1 | 9/2014 |
| EP | 3260225 A1 | 12/2017 |
| JP | 2011115896 A | 6/2011 |
| WO | 2003026820 A1 | 4/2003 |

* cited by examiner

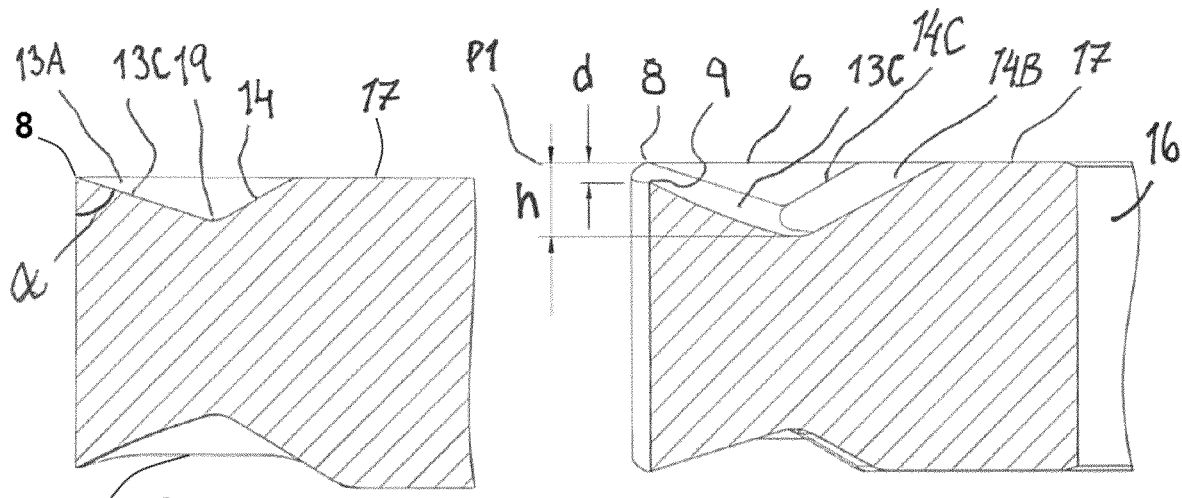
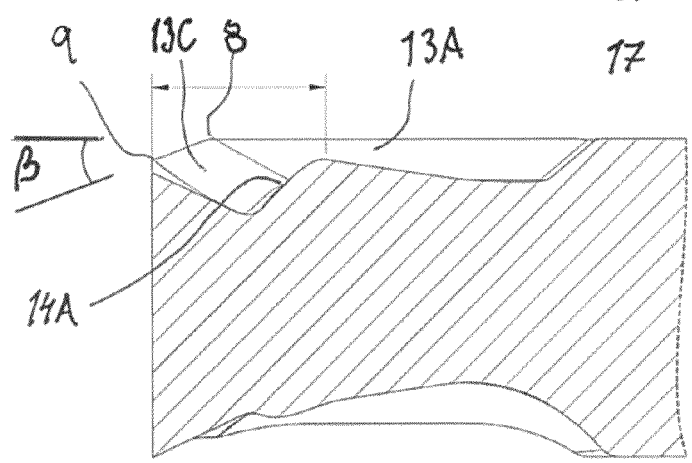
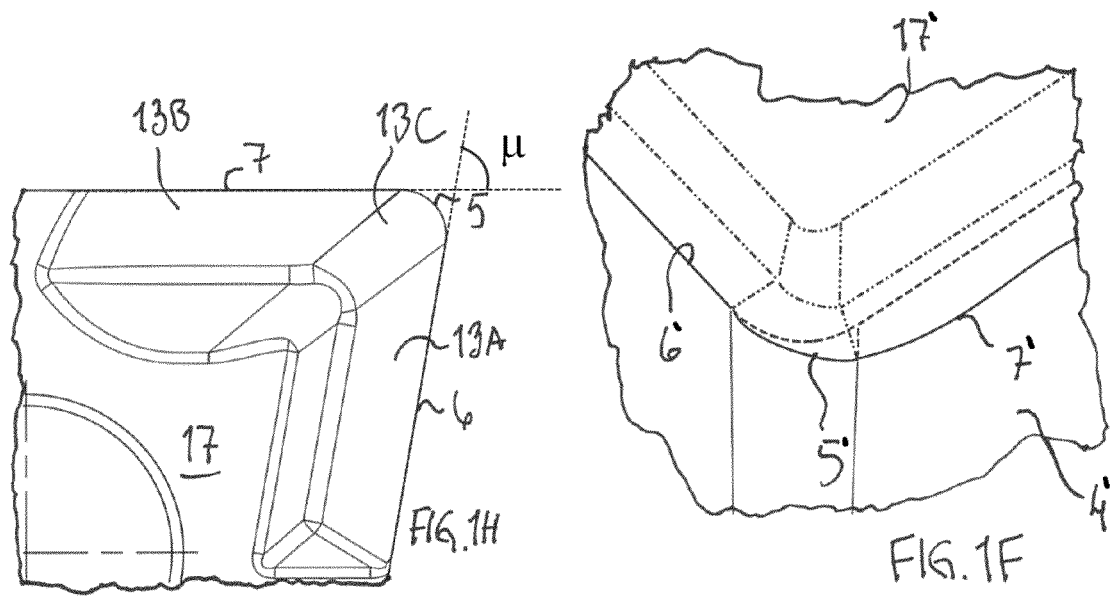

TURNING INSERT

RELATED APPLICATION DATA

This application is a § 371 National Stage Application of PCT International Application No. PCT/EP2017/076345 filed Oct. 16, 2017 claiming priority to EP 16194608.2 filed Oct. 19, 2016.

TECHNICAL FIELD OF THE INVENTION

The present invention belongs to the technical field of metal cutting. More specifically the present invention belongs to the field of turning inserts and turning tools used for metal cutting in machines such as computer numerical control, i.e. CNC, machines.

BACKGROUND OF THE INVENTION AND PRIOR ART

The present invention refers to a turning insert and a turning tool. A similar turning insert is known from U.S. Pat. Nos. 6,241,430 or 4,681,487.

A turning insert is commonly used in metal cutting, for machining a metal work piece, which after machining is rotationally symmetrical, such as e.g. cylindrical. In turning, commonly the work piece rotates around an axis of rotation, i.e. a rotational axis. A turning insert is clamped in a turning tool, which moves in relation to the metal work piece. The moving of the turning tool is commonly in a linear motion, and is designated feed. When turning a cylindrical surface, the movement of the turning tool is in a direction which is parallel to the axis of rotation of the work piece. In such longitudinal turning, the machined surface is commonly formed by an active corner cutting edge, also known as nose cutting edge.

The chips cut from the metal work piece during a turning operation are preferably short or have a shape such that they do not affect the metal work piece, the turning tool or the turning insert in a negative way. Further, chips should be shaped such they can be handled and removed from the machine in a convenient manner.

A common problem in turning of metal is that chips are long or otherwise have a shape which is not desirable, especially when turning e.g. low carbon steels at low depth of cut, i.e. a depth of cut which is smaller than the active nose radius of the turning insert.

Commonly, attempts to solve such problems have included: a) choosing smaller nose radius, which decrease the life of the turning insert; b) choosing a higher feed, which reduces the machined surface finish; c) using high pressure coolant to break chips, which may require expensive investments; and d) modifying the top surface such that a chip breaker, spaced apart from the active nose cutting edge, improves the shape of the chip after it is generated.

There are often substantial cutting forces during turning operations. Especially during turning of ISO-M and ISO-S materials temperature increases at the cutting zone, and hence reduces the tool-life.

Although improvements of turning insert design have been made the current inventor has seen a need for further improvements.

SUMMARY OF THE INVENTION

According to an aspect of the present invention, a turning insert for longitudinal turning of metal work pieces comprises a top surface, a bottom surface and a side surface connecting the top and bottom surfaces, wherein a midplane extends midway between and parallel to the top and bottom surfaces, intersections of the top surface and the side surface comprising a first and second or leading or major cutting edges connected by a nose cutting edge at an acute angled cutting corner, the nose cutting edge being defined by a nose radius, wherein the nose cutting edge slopes from the first or trailing or minor cutting edge in direction towards the second or leading or major cutting edge so as to reduce radial cutting forces during turning of a work piece.

According to another aspect of the present invention, the nose cutting edge extends from a first transition point to a second transition point, wherein the first or trailing or minor cutting edge is connected to the nose cutting edge at the first transition point, wherein the second or leading or major cutting edge is connected to the nose cutting edge at the second transition point, wherein a bisector extends between the first and second or leading or major cutting edges wherein the bisector in a top view intersects a mid-point of the nose cutting edge, wherein the trailing and leading cutting edges in a top view forms a nose angle of from 35 to less than 90° for favorable accessibility during turning.

According to another aspect of the present invention, the top surface comprises a chip forming space, wherein the chip forming space borders on the first, second and nose cutting edges, wherein a distance from the midplane to the first transition point is greater than a distance from the midplane to the second transition point for favorable chip forming and for further reducing radial cutting forces.

According to another aspect of the present invention, the second or leading or major cutting edge is disposed at a right-hand side of the nose cutting edge in a front view where the top surface is located above the bottom surface for reducing radial cutting forces during right-hand turning.

According to another aspect of the present invention, the chip forming space comprises a first rake surface adjacent to the first or trailing or minor cutting edge, a second rake surface adjacent to the second or leading or major cutting edge, and a third rake surface adjacent to the nose cutting edge, the chip forming space further comprising a first upstanding wall facing the first or trailing or minor cutting edge, a second upstanding wall facing the second or leading or major cutting edge, and a third upstanding wall facing the nose cutting edge, wherein the third upstanding wall is located between and connecting the first and second upstanding walls, wherein the third upstanding wall is convex in a top view for facilitating favorable chip forming.

According to another aspect of the present invention, each rake surface connects to an upstanding wall via a transition portion, wherein the transition portion associated with the second or leading or major cutting edge is located closer to the midplane as compared to a distance between the transition portion associated with the first or trailing or minor cutting edge and the midplane for balancing favorable cutting forces.

According to another aspect of the present invention, the nose cutting edge slopes at an angle relative to a plane parallel to the midplane wherein the angle is in the range of 10 to 30°, preferably 15 to 25° for further reducing radial cutting forces.

According to another aspect of the present invention, the nose cutting edge extends from a first transition point to a second transition point, and wherein the second transition point defines the point being located closest to the midplane.

According to another aspect of the present invention, all rake surfaces form acute angles with the associated side surface for generally reducing cutting forces.

According to another aspect of the present invention, the nose cutting edge is asymmetrically arranged relative to a plane containing the bisector to be used in one of right-hand and left-hand turning directions, and wherein the first or trailing or minor cutting edge is convexly curved when seen in a top view for providing a wiper effect on the workpiece.

According to another aspect of the present invention, a midplane extends equidistantly between the top and bottom surfaces, wherein the top surface comprises a first flat surface extending parallel to the midplane, and wherein the turning insert has at least one set of cutting edges—in an each acute angled corner. An acute angled corner may comprise one or two sets of cutting edges on opposite sides of the midplane. Often the turning insert according to the present invention comprises four sets of cutting edges, i.e. two acute angled corners, for being an indexable turning insert. The number of acute angled corners is of course optional in a turning insert having a geometry such as a star shape to allow for more acute angled corners.

According to another aspect of the present invention, a midplane extends equidistantly between the top and bottom surfaces, wherein a shortest distance from a second transition point of the nose cutting edge to the midplane is less than a shortest distance from the first transition point to the midplane.

According to another aspect of the present invention, the turning insert comprises at least 99% cemented carbide or at least 99% cermet, wherein the first surface is formed by pressing and sintering for favorable tool life.

According to another aspect of the present invention, the turning insert in a top view is shaped as a parallelogram or a rhomboid, wherein the turning insert, including the first surface, is made from cemented carbide or cermet.

According to a further aspect of the present invention, a turning tool comprises a tool body and the turning insert, wherein the tool body comprises a seat in which the turning insert is mountable, wherein the tool body comprises a front end, a rear end, and a longitudinal axis intersecting the front and the rear ends, and wherein the bisector intersecting a mid-point of the active nose cutting edge in a top view forms an angle of 40-50° relative to the longitudinal axis of the tool body.

DESCRIPTION OF THE DRAWINGS

The present invention will now be explained in more detail by a description of an embodiment of the invention and by reference to the accompanying drawings, wherein

FIG. 1D shows a cross-sectional view along line D-D in FIG. 1C;

FIG. 1E shows a cross-sectional view along line E-E in FIG. 1C;

FIG. 1F shows a magnified perspective view of an alternative section corresponding to FIG. 1A, schematically;

FIG. 1G shows a cross-sectional view along line G-G in FIG. 1C;

FIG. 1H shows a portion of the turning insert in top view;

All turning insert drawings or figures have been drawn to scale.

DETAILED DESCRIPTION OF EMBODIMENTS OF THE INVENTION

Reference is made to FIGS. 1 to 3B, which show a turning insert 1 according to an embodiment according to the present invention.

The turning insert 1 has the dimension or general shape of the type commonly known as CNMA 120408 or CNMG 120408, i.e. a single-sided or a double-sided turning insert, respectively.

Figure 1B:
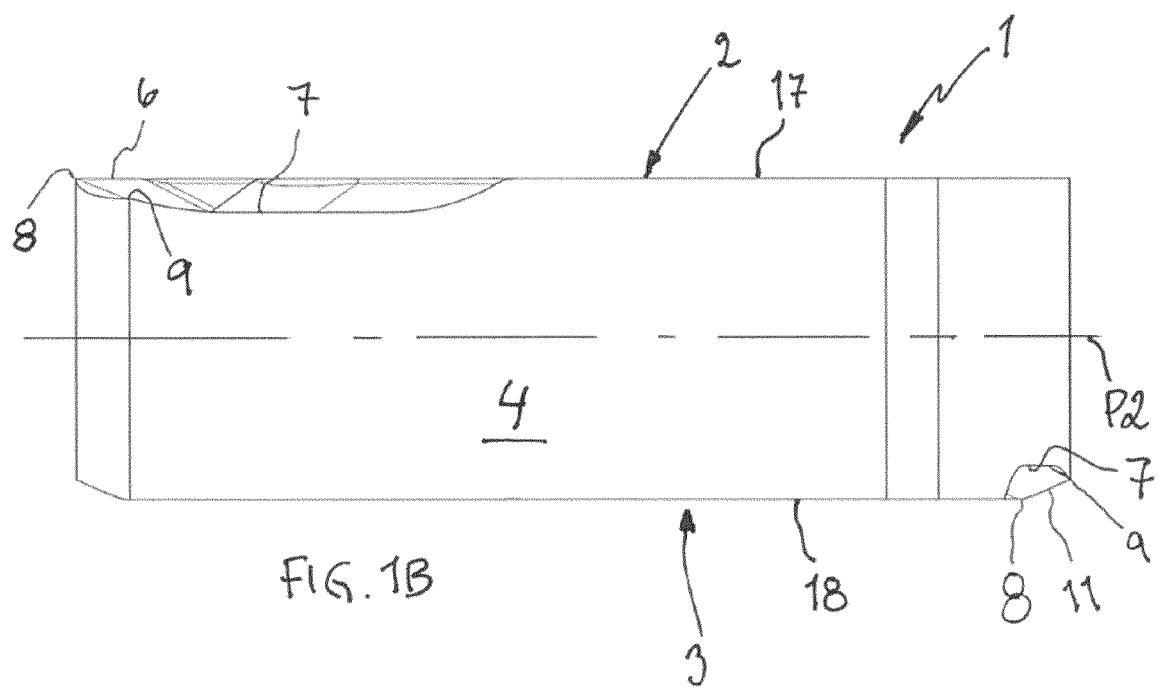
FIG. 1B shows a side view of the turning insert in FIG. 1A.
Figure 2A:
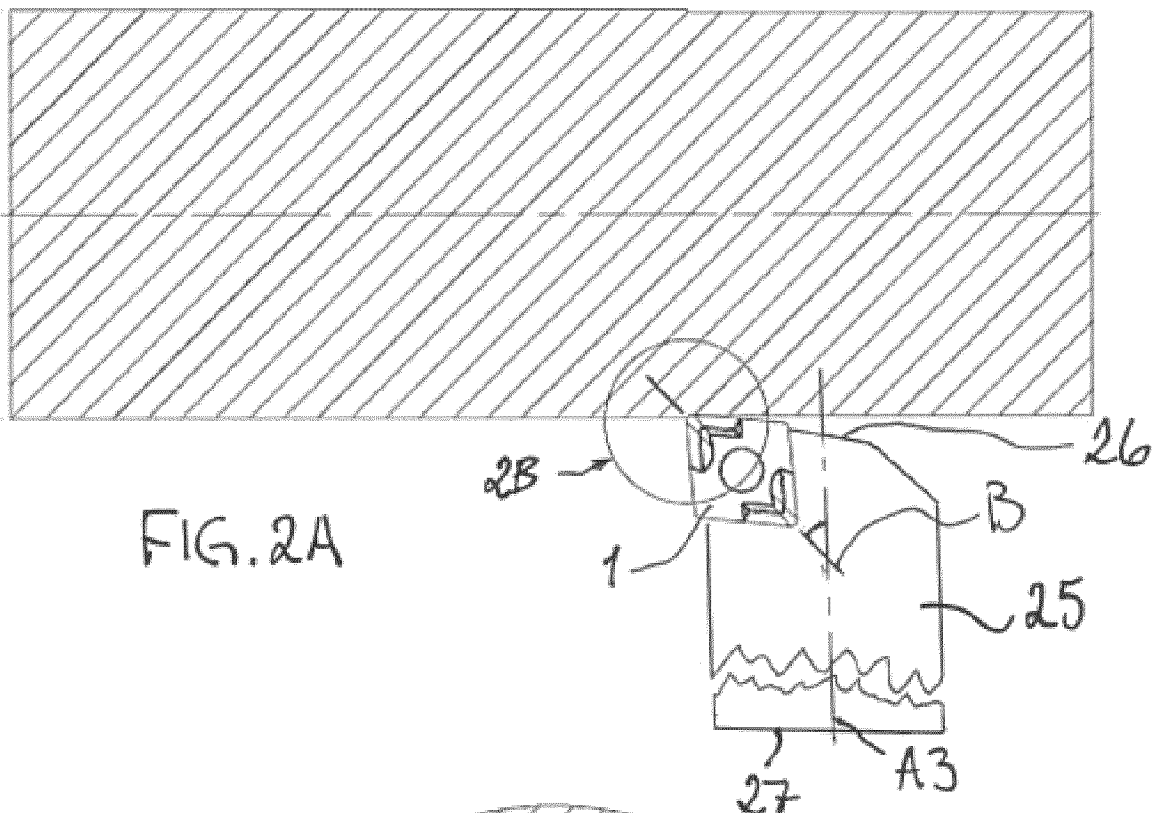
FIG. 2A shows the turning insert and a work piece at a small cutting depth.

The turning insert 1 comprises a top surface 2, an opposite bottom surface 3, a circumferential side surface 4 connecting the top and bottom surfaces 2, 3 and a circumferential edge 15 formed at an intersection of, or between, the top surface 2 and the side surface 4. The side surface 4 is a clearance surface during turning. As seen in FIG. 1B, a midplane P2 extends equidistantly between the top and bottom surfaces 2 and 3. The top surface 2 comprises a first flat surface 17 that may extend parallel to the midplane P2. The bottom surface 3 comprises a second flat surface 18 that may extend parallel to the midplane P2. When a circumferential edge 15 adjacent to the top surface 2 faces towards a work piece, the second flat surface 18 functions as a seating surface when the turning insert is mounted in a seat formed in a tool body 25 (FIG. 2A).

Figure 1A:
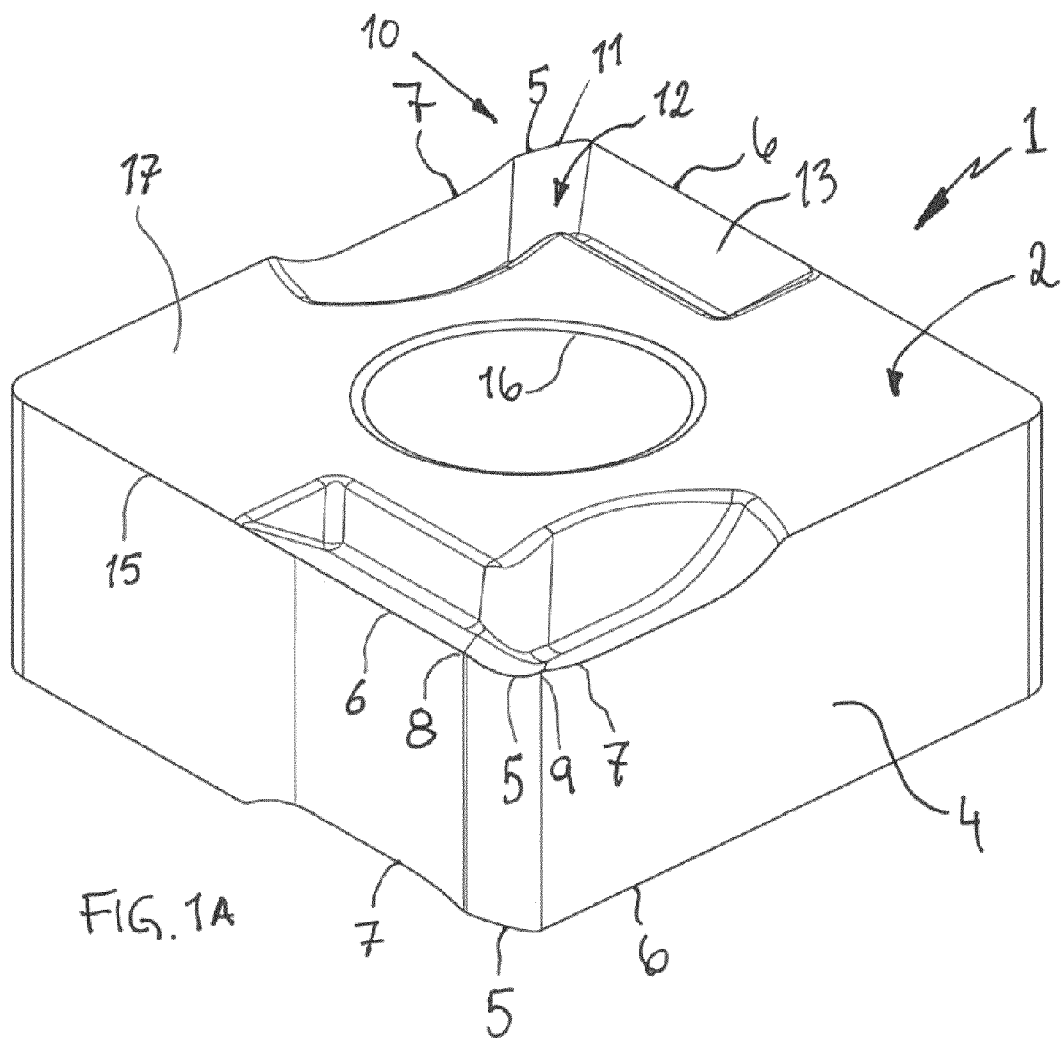
FIG. 1A shows a perspective view of a turning insert according to the present invention.

The top surface 2 and the bottom surface 3 may be identical when rotated 180° relative to an imaginary axis extending in the midplane P2 at a longest diagonal of the turning insert (e.g. from the position of the turning insert shown in FIG. 1A). A central through hole 16 suitable for a clamping means such as a screw or a clamp, not shown, may extend along a center axis A1 of the turning insert 1 and may intersect the top surface 2 and the bottom surface 3. The center axis A1 of the turning insert 1 can be perpendicular or substantially perpendicular to the midplane P2.

The circumferential edge 15 comprises a nose cutting edge 5, a first or trailing or minor cutting edge 6 and a second or leading or major cutting edge 7. A first end of the nose cutting edge 5 and the first or trailing or minor cutting edge 6 are connected at a first transition area or point 8, and an opposite second end of the nose cutting edge 5 and the second or leading or major cutting edge 7 are connected at a second transition area or point 9. The circumferential extension of each said area or point is 1 micron to 0.1 mm, e.g. much less than a usual radius R of curvature of the nose cutting edge 5.

A clearance or relief surface below the or each nose cutting edge 5 is part cylindrical or part conical in a conventional manner at least about the level of the midplane P2.

A shortest distance from the midplane P2 to a point on the first flat surface 17 may be greater than a shortest distance from the midplane P2 to a point on the major cutting edge 7. The first flat surface 17 may be spaced apart from the circumferential edge 15 at cutting corners of the turning insert by means of a recess or chip breaker groove 12.

Figure 1C:
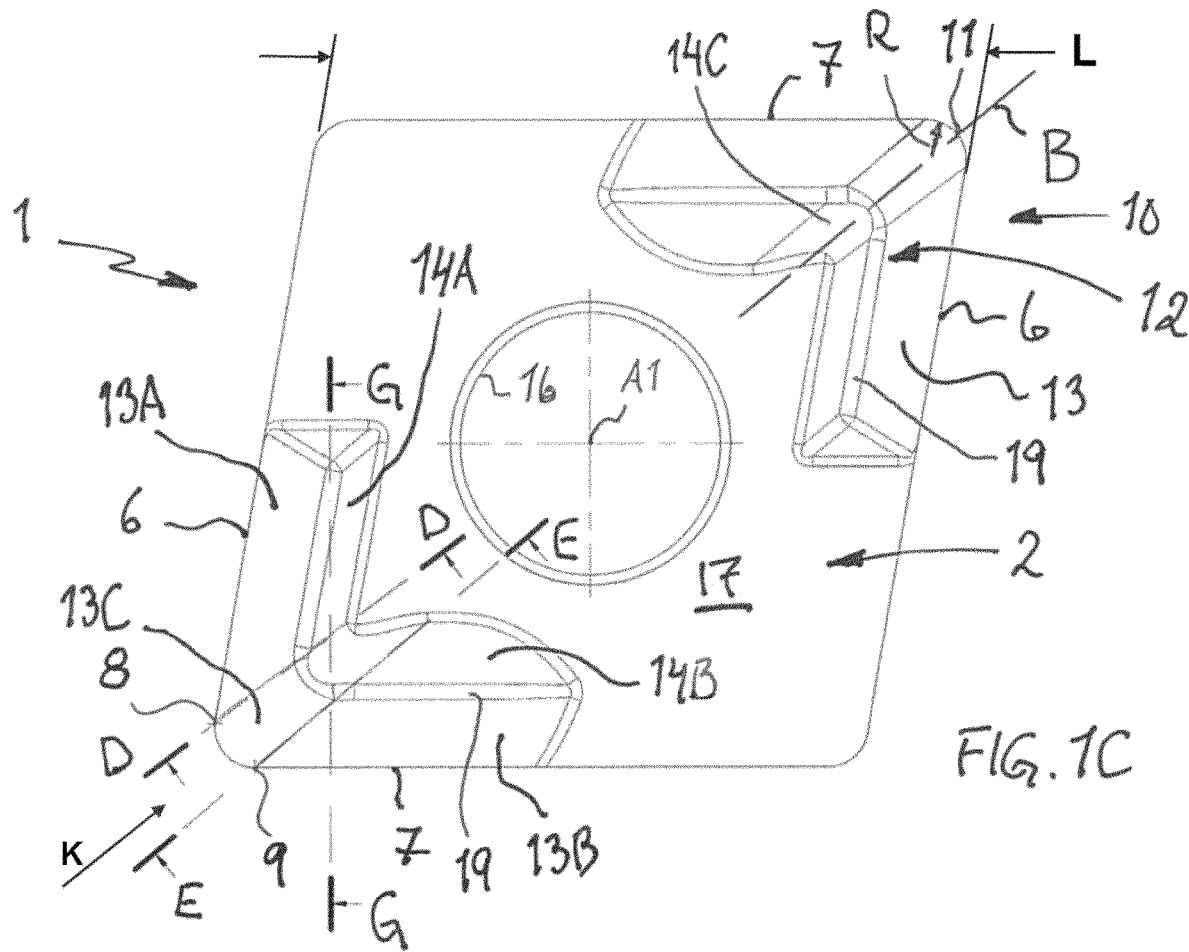
FIG. 1C shows a top view of the turning insert in FIG. 1A.

As can be seen in e.g. FIG. 1C, the first and second or leading or major cutting edges 6, 7 are straight or substantially straight in a top view. The first and second or leading or major cutting edges 6, 7 may extend to about the half of a length L (FIG. 1C) of the turning insert.

The first or trailing or minor cutting edge 6 may be flat or convexly curved edge to form a wiper edge. The wiper edge for turning is based on one or several radii that make up the cutting edge. The wiper edge may be made up of a large, main radius complemented by several smaller radii. A long wiper edge may add to the radial cutting forces. The wiper edge will smooth the scalloped tops that would otherwise have been created in the generated surface during turning.

The nose cutting edge 5 is convex in a top view. As seen in FIG. 1C, a bisector B extends equidistantly between the first and second cutting edges 6, 7 and intersects a midpoint 11 of the nose cutting edge 5 in a top view, i.e. a point halfway between the two ends 8 and 9. A plane P3 containing the bisector B and being perpendicular to the midplane P2 may intersect the midpoint 11.

The nose cutting edge 5 has a constant or substantially constant radius R of curvature in a top view. The radius of curvature is in the range of 0.1 to 2.0 mm. The nose cutting edge 5 in the top view of FIG. 1C is shaped as an arc of a circle, for example with a radius of 0.8 mm.

Figure 1K:
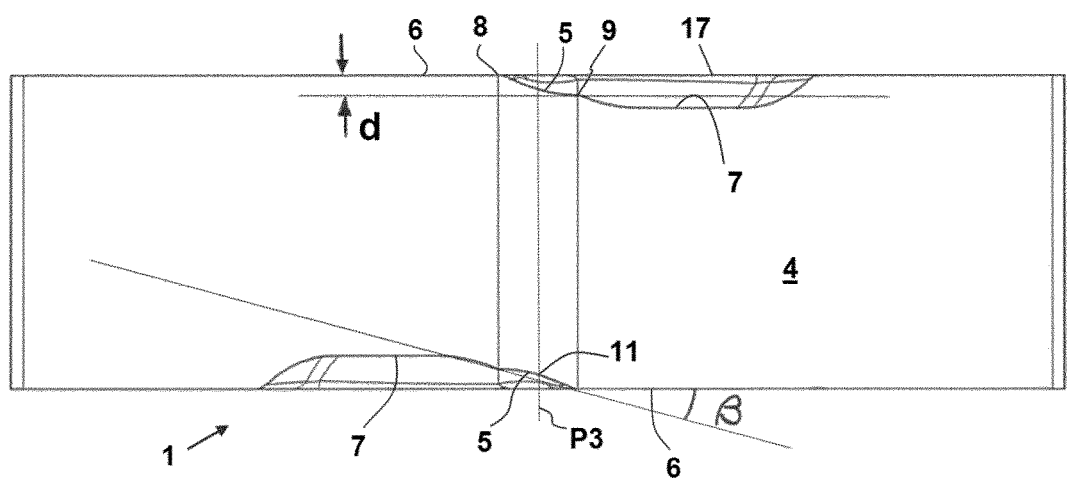
FIG. 1K shows the turning insert in a frontal side view in the direction shown by arrow K in FIG. 1C.
Figure 1I:
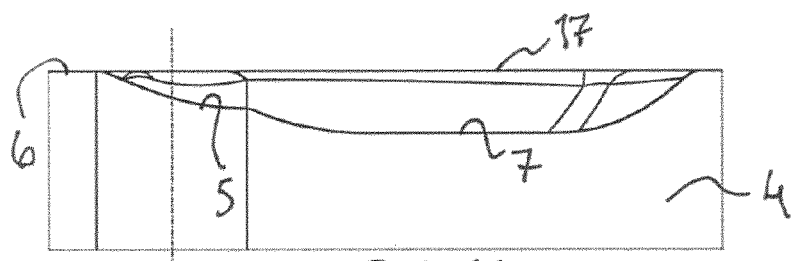
FIG. 1I shows a portion of the turning insert in side view.
Figure 1J:
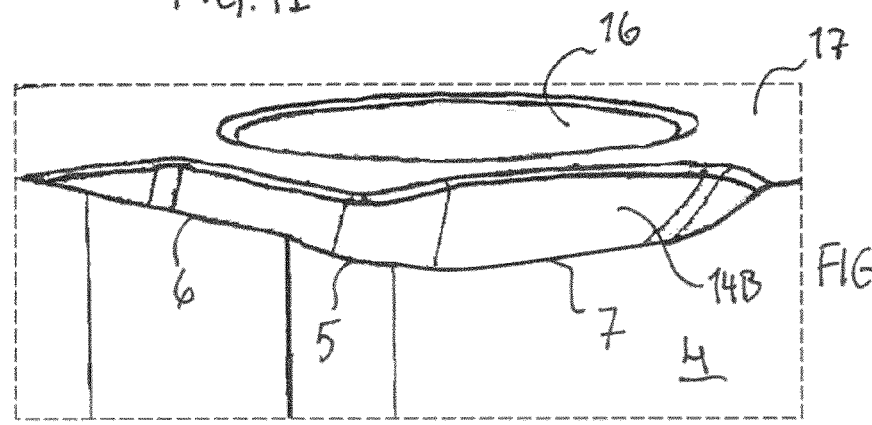
FIG. 1J shows a portion of the turning insert in perspective front view.

The nose cutting edge 5 at the first transition point 8 may be tangent to the first cutting edge 6 in a top view, and the nose cutting edge 5 at the second transition point 9 may be tangent to the second cutting edge 7 in a top view. As best seen in FIGS. 1I, 1J and 1K, at least 90% of the nose cutting edge 5 may be concave in a front view.

The transition point 9 at the end of the nose cutting edge 5 being located closest to the major cutting edge 7 may be the most depressed portion of the nose cutting edge 5.

The major cutting edge 7 may connect to the nose cutting edge 5 via a local peak, see e.g. FIG. 1K.

As can be seen in FIG. 1C, the midpoint 11 of the nose cutting edge 5 of the acute angled cutting corner 10 of the turning insert 1 in a top view is the part of the circumferential edge 15 which is positioned at the greatest distance from the center axis A1 of the turning insert 1. By the term "acute angle" is here meant forming an angle that is less than 90°.

As evident from FIG. 1B a distance from the midpoint 11 of the nose cutting edge 5 to the midplane P2 is shorter than a distance from the first transition point 8 to the midplane P2. The distance from the midpoint 11 of the nose cutting edge 5 to the midplane P2 is greater than a distance from the second transition point 9 to the midplane P2.

Stated another way, the distance or drop d between the first transition point 8 and the second transition point 9 may be in the range of 0.05 to 0.5 mm, preferably in the range of 0.1 to 0.3 mm.

All portions of the leading cutting edge 7, 7' may be located below all portions of the trailing cutting edge 6, 6' and the drop or difference in height direction is bridged by the nose cutting edge 5, 5'.

The nose cutting edge 5 slopes linearly or non-linearly towards the midplane P2. More than 50% of the arc length of the nose cutting edge 5 slopes as measured in direction away from the first cutting edge or minor cutting edge 6 towards the second cutting edge or major cutting edge 7. More than 50% of the arc length of the nose cutting edge 5 can be located above the second cutting edge or major cutting edge 7, preferably 80 to 100% is located above the second cutting edge or major cutting edge 7.

A line as seen in the frontal side view of FIG. 1K intersecting the transition points 8 and 9 may form an acute angle β with the midplane P2 or top surface 17 or bottom surface 18 that is 10 to 30°, preferably 15 to 25°. Of course, the acute angle β value depends on what drop d value is chosen. In a double-sided insert each such line would be parallel with the other line at the same cutting corner as seen in FIG. 1K.

As can be seen in e.g. FIG. 1F, the major cutting edge 7' may smoothly or without local peaks (or valleys) connect to the nose cutting edge 5' and the latter follows a path that rises along the side surface 4' towards the minor cutting edge 6', that is located below the plane of the top surface 17'. The major cutting edge 7' and the nose cutting edge 5' are located under dashed lines in FIG. 1F. The dashed line and curve immediately above edges 5' and 7' represent conventional turning edges.

At least one acute angled cutting corner 10 of the top surface 2 comprises a recess or chip breaker groove 12. The chip breaker groove 12 comprises a first or rake surface 13 in the form of an inclined surface, which borders to all cutting edges 5, 6 and 7 or at least a major portion, or to at least 75%, of the cutting edges in the acute angled cutting corner 10. The inclined surface or rake surface 13 forms an acute edge angle α with the clearance surface. The acute edge angle is chosen in the range of 60 to 85°, preferably 70 to 80°.

The width of the rake surface 13 perpendicular to the associated cutting edge 6 or 7 may be constant or substantially constant. The width may alternatively vary, e.g. such that the width increases as it is measured farther away from the nose cutting edge 5.

The width of the rake surface 13 perpendicular to the associated nose cutting edge 5 may vary such that the width measured along a normal to the midpoint 11 is greater than at the end points 8 and 9. Alternatively the width may be constant or substantially constant.

The rake surface 13 of the chip forming space 12 may comprise a first rake surface 13A adjacent to the first cutting edge 6, a second rake surface 13B adjacent to the second cutting edge 7, and a third rake surface 13C adjacent to the nose cutting edge 5.

The trailing and leading cutting edges 6,7; 6', 7' form a nose angle μ in a top view in the range of from 35 to less than 90°, (FIG. 1H). In a top view, as seen in FIG. 1C, the first and the second cutting edges 6, 7 forms a nose angle which is 80°.

The rake surface 13 of the chip forming space 12 connects to an upstanding wall 14 via a transition portion 19. A first upstanding wall 14A faces the first cutting edge 6, a second upstanding wall 14B faces the second cutting edge 7, and a third upstanding wall 14C faces the nose cutting edge 5. The third upstanding wall 14C is located between and connecting the first and second upstanding walls 14A, 14B. The third upstanding wall 14C may be convex in a top view.

A depth h of the chip forming space 12 is measured between the transition portion 19 and a plane P1 at least partially containing the top surface 2. The plane P1 is usually parallel with the midplane P2. The depth h may vary such that it may be different on each side of the bisector B. The depth h may be deeper on the side of the bisector which is associated with the main or second cutting edge 7 where greater chips usually are being formed during turning.

At least the majority of the first surface 13C is concave when seen in cross sections in planes perpendicular to the bisector B, from the midpoint 11 of the nose cutting edge 5 towards the third upstanding wall 14C.

A shortest distance in a top view between the midpoint 11 of the nose cutting edge 5 and the third upstanding wall 14C is at least 125% and less than or equal to 300% of the radius of curvature of the nose cutting edge 5 in a top view.

As can be seen in e.g. FIG. 1K, the top surface 2 of the turning insert 1, including the nose cutting edge 5 and the first surface 13, is asymmetrically arranged relative to the plane P3 containing the bisector B.

In the embodiment, as best seen in FIG. 1C the top surface 2 comprises two diametrically opposite 80° cutting corners, in a top view, where each 80° corner comprises cutting edges 5-7 and an adjacent first surface 13 in the form of a depression. The turning insert 1 comprises two opposite obtuse or 100° corners, in a top view, that may or may not have adjacent inclined rake surfaces and can be called non-cutting corners. Alternatively the obtuse corners may comprise a nose cutting edge and an adjacent inclined rake surface.

As is shown in FIG. 1D, an edge angle α formed between the first rake surface 13 and the side surface 4 along at least the nose cutting edge 5, is less than 90°. In FIG. 1D the edge angle α is 65°-75°. The edge angle α is measured in a plane being normal to the relevant cutting edge.

As can be seen in e.g. FIG. 1B, the first and second cutting edges 6, 7 are spaced apart in relation to the midplane P2. The second cutting edge 7 is located closer to the midplane P2 as compared to the distance between the first cutting edge 6 and the midplane P2.

Figure 4:
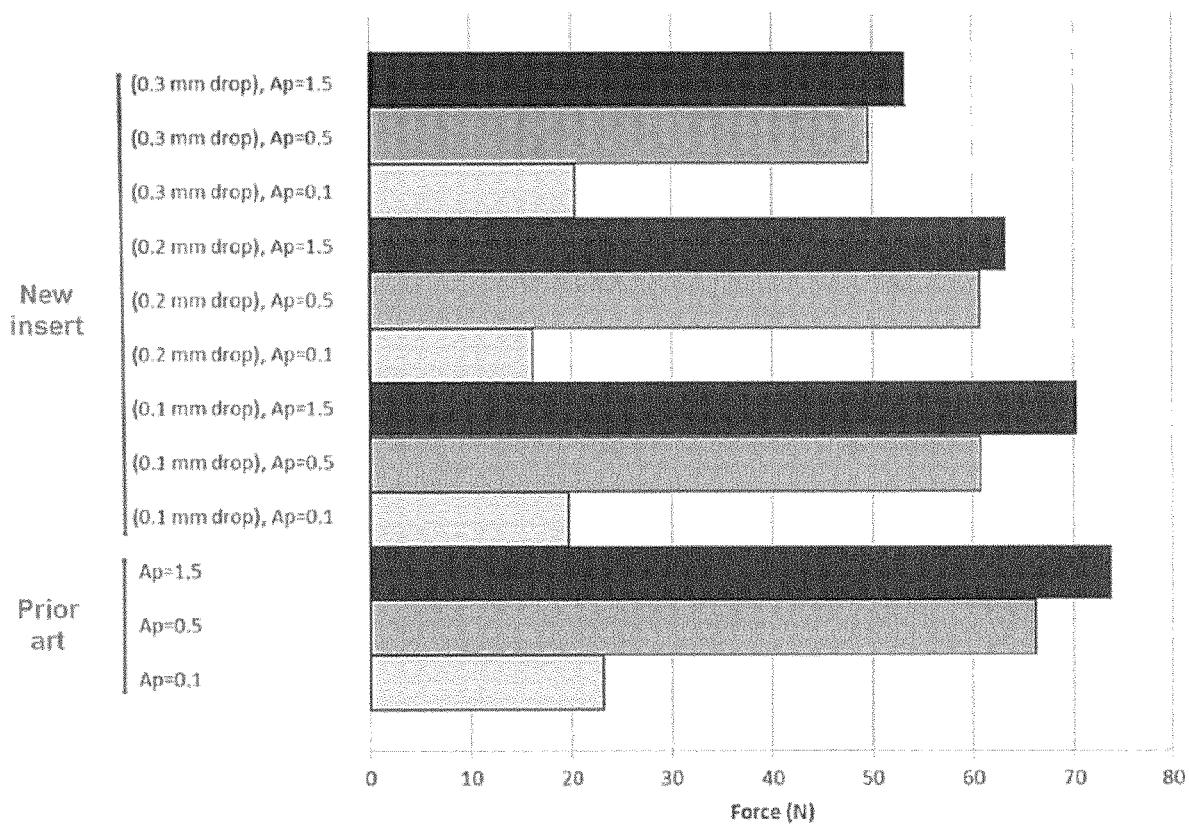
FIG. 4 shows a graph of radial cutting forces in relation to cutting insert geometry and cutting depth.

Reference is now made to FIG. 4 which shows a graph of radial cutting forces in relation to cutting insert geometry and cutting depth Ap. The Prior art insert used as comparison is of the type commonly known as CNMG 120408 of a rhombic basic shape, with an 80° active nose angle. The insert has a nose radius of 0.80 mm and thus a drop d=0.0 mm. Tests have been performed by longitudinal turning, i.e. turning with a feed direction parallel to the rotational axis of the metal work piece to be machined. The entering angle during machining was 95°. The active cutting corner of the insert has an 80° nose angle in a top view. Coolant in the form of emulsion at approximately 10 bars has been used. The cutting speed has been 120 m/min. The metal work piece is a material according to Swedish standard SS 2348 (corresponding to EN 1.4404), i.e. a low carbon stainless steel containing an addition of molybdenum for improved corrosion resistance.

Tests have been performed at different cutting depths Ap at feed rates of 0.12 and 0.3 mm/rev with different turning inserts. The feed was changed from 0.12 mm/rev after 4 seconds of turning to 0.3 mm/rev for an additional 4 second period of turning during each turning operation. Twelve turning operations were completed while radial cutting forces were measured.

The rows in FIG. 4 show radial cutting force averages for different cutting depths and nose cutting edge 5 drop d for the insert according to the present invention (named "New Insert" in FIG. 4) and for a conventional turning insert (named "Prior art" in FIG. 4). From the top row to the bottom row, the cutting depths Ap was 1.5; 0.5 and 0.1 mm for each nose cutting edge 5 drop d of 0.3; 0.2 and 0.1 mm. The prior art insert was tested with identical cutting data as the above-captioned inserts but without having any built-in drop. The substrate and the coating were the same for all tested inserts, i.e. only the geometry differed.

Figure 2B:
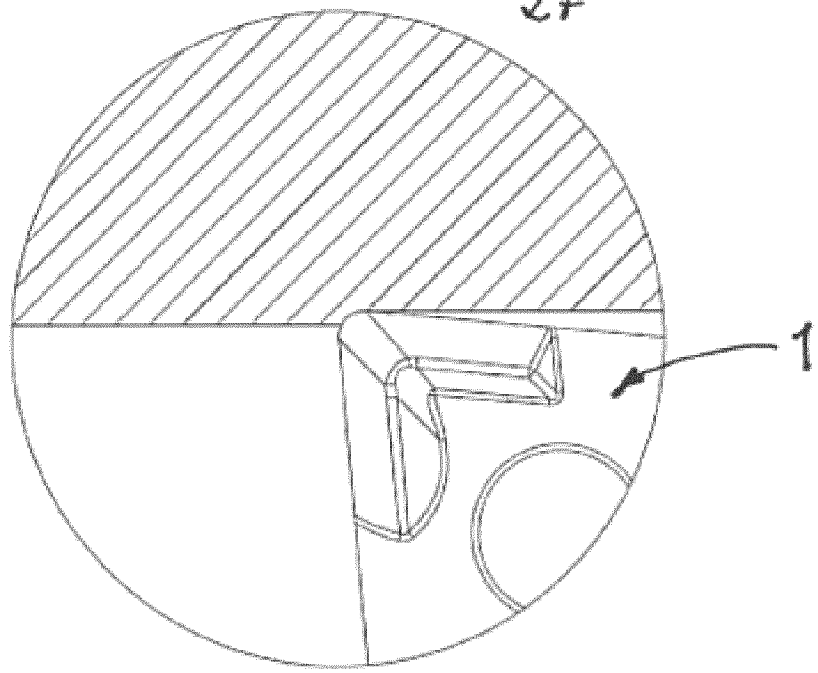
FIG. 2B shows a magnified view of a section 2B in FIG. 2A.
Figure 3A:
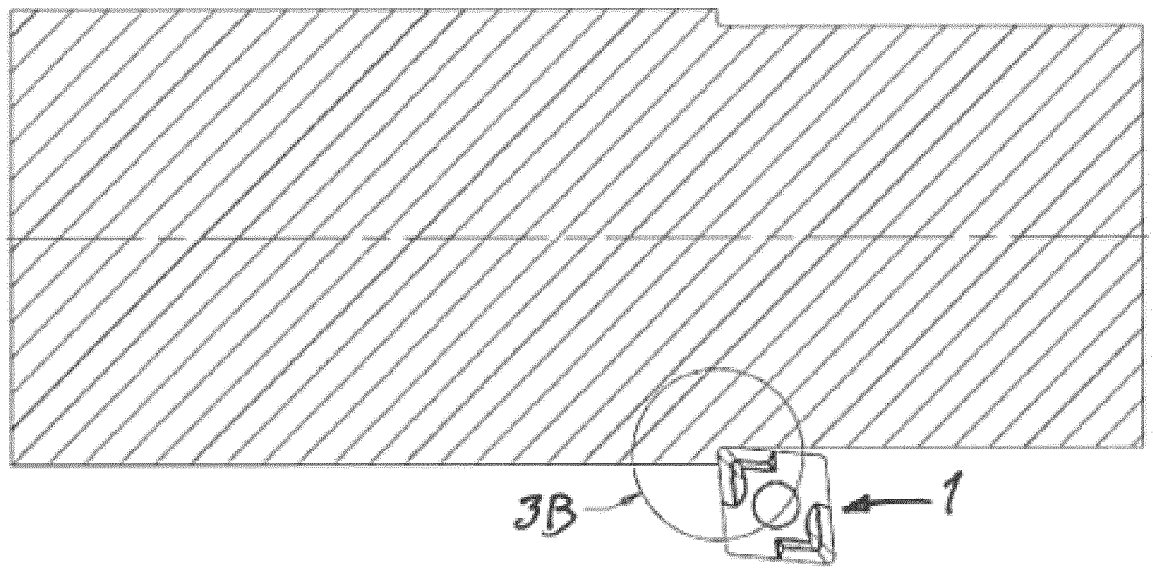
FIG. 3A shows the turning insert and a work piece at a greater cutting depth than in FIG. 2A.
Figure 3B:
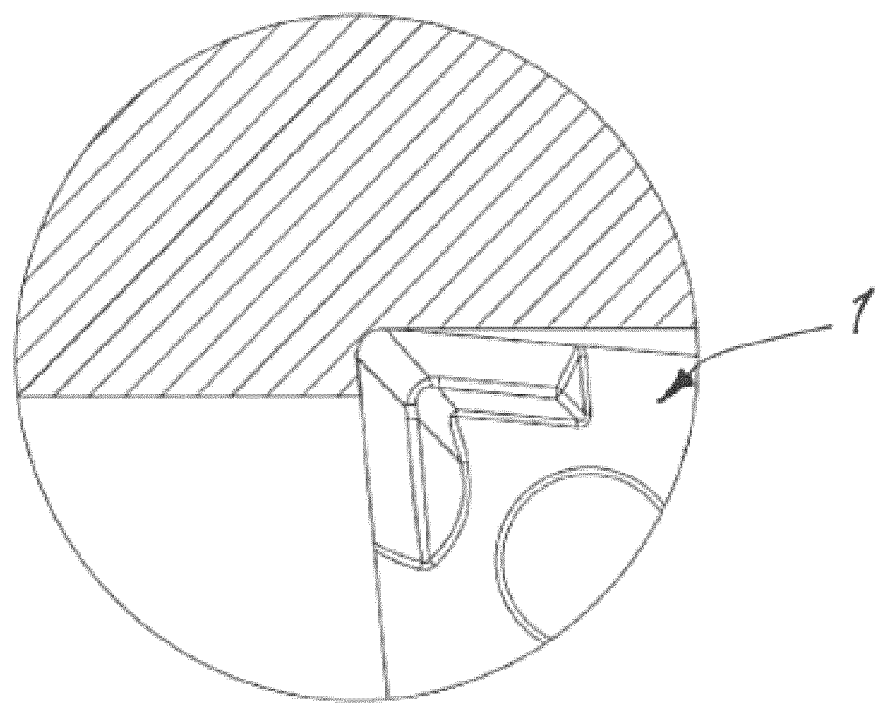
FIG. 3B shows a magnified view of a section 3B in FIG. 3A.

FIGS. 2A and 2B schematically show the test set-up at cutting depth less than the nose cutting edge radius, e.g. where the cutting depth is about 0.5 mm. FIGS. 3A and 3B schematically show longitudinal turning at a cutting depth much greater than the nose cutting edge radius, e.g. about 2.0 mm.

A turning tool is partially shown in FIG. 2A and it comprises a tool body 25 and the turning insert 1. The tool body 25 has a seat in which the turning insert 1 is mountable. The tool body 25 has a front end 26, a rear end 27, and a longitudinal axis A3 intersecting the front and the rear ends 26, 27. The bisector B intersects the midpoint 11 of the active nose cutting edge 5 in the top view and forms an angle of 40-50° relative to a longitudinal axis A3 of the tool body 25.

The test results show that the insert according to the present invention makes it possible to reduce the radial cutting force component and is thus able to implement the invention in products, where radial cutting forces are crucial to be kept as low as possible, e.g. at turning of vibration prone components, or to balance forces when using wiper geometries. The turning insert according to the present invention may reduce the overall radial cutting force components with up to ~39% compared to the conventional insert having no drop.

Figure 5:
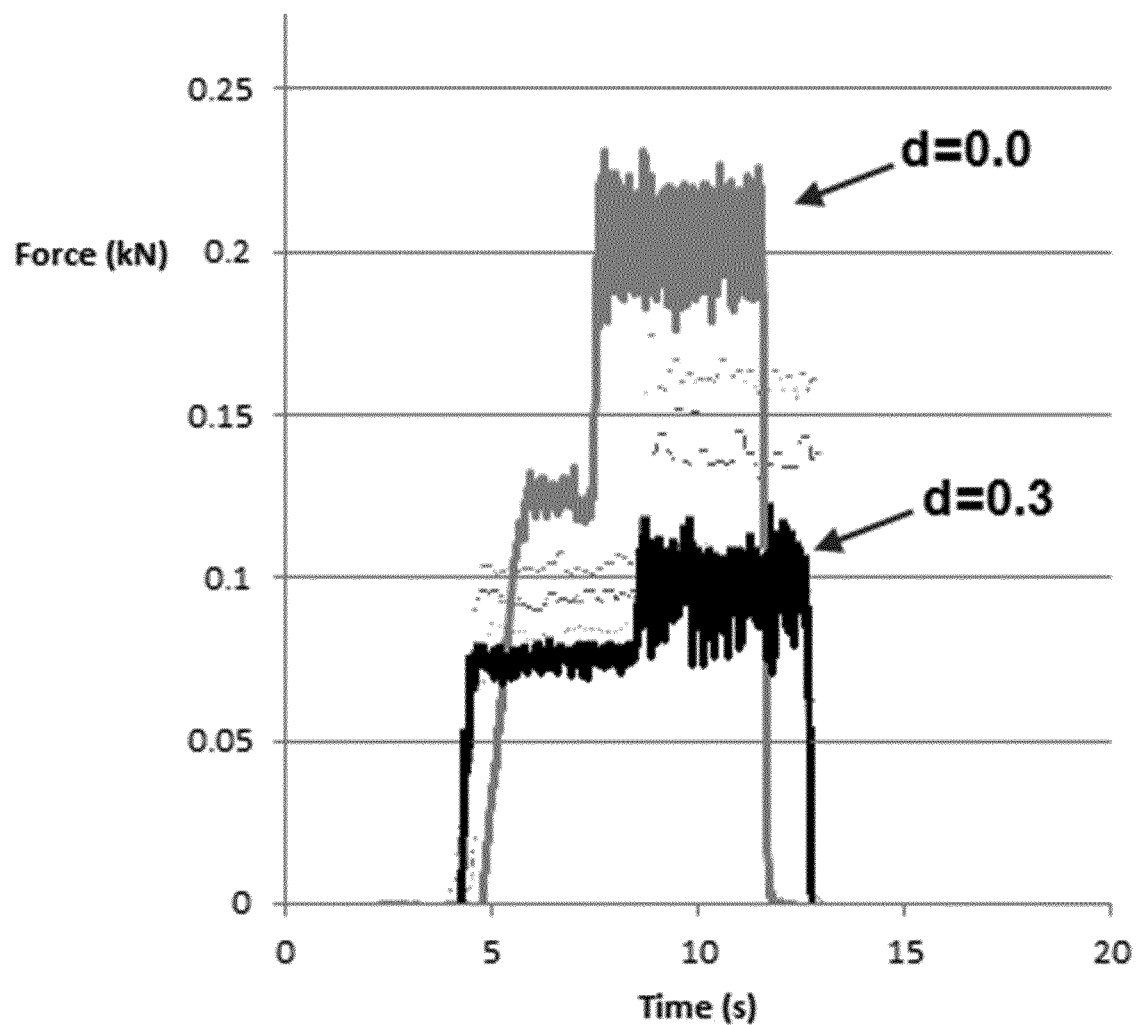
FIG. 5 shows an example of measured radial forces at feed 0.12 and 0.3 mm/rev and cutting depth 1.5 mm for two turning inserts.

Referring now to FIG. 5 as an example, when looking at measured forces at feed 0.3 mm/rev and Ap=1.5 mm for the prior art insert (see d=0.0), the radial force value was about 0.2 kN to be compared with the turning insert according to the present invention (see d=0.3) having 0.3 mm drop where the value was about 0.1 kN. The drops 0.1 and 0.2 mm have been substantially masked from the graph for illustrative purposes, but they lie in between the two shown force curves, where an insert with drop=0.1 mm had a higher radial force value than an insert with drop=0.2 mm.

It was further noted at the test that tangential force values did not differ in a significant manner for all inserts but the axial force values was highest for the insert with drop=0.3 mm since it has the nose cutting edge 5 with the greatest length of engagement with the work piece for all cutting depths Ap.

The conclusion is that from a tool life perspective, an increase of tool life in turning steel with a turning insert according the invention can be expected at any depth of cut.

Although the embodiments described above have been of the general shape or dimension commonly known as CNMA or CNMG, other shapes of inserts are feasible. For example, WNMG-type inserts are possible, where the trigon top surface comprises three 80° corners in a top view. Also other types of turning inserts are possible. For example, single sided, or positive, turning inserts are possible, such as CCMT-type turning inserts.

The turning insert may comprise at least 99% cemented carbide or at least 99% cermet. The first surface 13 may be formed by pressing and sintering. The turning insert when seen in a top view may be shaped as a parallelogram or a rhomboid. The turning insert, including the first surface 13, may be made from cemented carbide or cermet.

The turning insert and turning tool according to the present invention may reduce the cutting forces at any depth of cut, i.e. even at depths of cut that is less than the nose radius size. In the physical experiments has been shown that the turning insert and turning tool according to the present invention may reduce the radial cutting force components with up to about 39% compared to a conventional insert. This reduction will decrease the heat generated in the cutting zone and hence, increase the tool-life. The turning insert geometry according to the present invention can also be used in combination with other types of products/applications—especially in combination with wiper inserts. Wiper inserts are designed with a large flat or convexly curved edge to be able to generate a smoother surface finish. The drawback of the latter is of course the increased radial cutting force components. Combining the turning insert geometry according to the present invention with a wiper design, the additional radial cutting force component can be reduced or completely removed.

The nose cutting edge is sloping downward from a contact point with the work piece towards the main cutting edge. By tilting or sloping the nose cutting edge the design will be either of left- or right-hand style.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The term "slopes" or "sloping" shall here be interpreted as moving in direction towards the midplane P2. The terms "trailing" and "leading" refer to the normal cutting direction of a turning insert such that the indexable turning insert has a leading cutting edge for coarse cutting operations and a trailing cutting edge for fine cutting operations, as best illustrated by FIG. 3B.

The invention claimed is:

1. A turning insert for longitudinal turning of metal work pieces, comprising:
    a top surface;
    a bottom surface; and
    a side surface connecting the top and bottom surfaces, wherein a midplane extends midway between and parallel to the top and bottom surfaces, intersections of the top surface and the side surface having a first, trailing, or minor cutting edge, a second, leading, or major cutting edge connected by a nose cutting edge at an acute angled cutting corner, the nose cutting edge being defined by a radius, and wherein the nose cutting edge slopes towards the midplane from the first, trailing, or minor cutting edge in direction towards the second, leading, or major cutting edge, wherein the top surface includes a chip forming space, wherein the chip forming space borders on the first, trailing, or the minor cutting edge, the second, leading, or the major cutting edge and the nose cutting edge, the chip forming space including a rake surface in the form of a depression, wherein the chip forming space includes a first rake surface adjacent to the first, trailing, or minor cutting edge, a second rake surface adjacent to the second, leading, or major cutting edge, and a third rake surface adjacent to the nose cutting edge, the chip forming space including a first upstanding wall facing the first, trailing, or minor cutting edge, a second upstanding wall facing the second, leading, or major cutting edge, and a third upstanding wall facing the nose cutting edge, wherein the third upstanding wall is located between and connecting the first and second upstanding walls.

2. The turning insert according to claim 1, wherein the nose cutting edge extends from a first transition point to a second transition point, wherein the first, trailing, or minor cutting edge is connected to the nose cutting edge at the first transition point, wherein the second, leading, or major cutting edge is connected to the nose cutting edge at the second transition point, wherein a bisector extends between the first, trailing, or minor and the second, leading, or major cutting edges, wherein the acute angled corner has an angle of from 35 to less than 90°.

3. The turning insert according to claim 2, wherein a distance from the midplane to the first transition point is greater than a distance from the midplane to the second transition point.

4. The turning insert according to claim 1, wherein in a front view, wherein the top surface is located above the bottom surface, the second, leading, or major cutting edge is disposed at a right-hand side of the nose cutting edge.

5. The turning insert according to claim 1, wherein the third upstanding wall is convex in a top view.

6. The turning insert according to claim 5, wherein each rake surface connects to the upstanding wall via a transition portion, wherein the transition portion associated with the second, leading, or major cutting edge is located closer to the midplane as compared to a distance between the transition portion associated with the first, trailing, or minor cutting edge and the midplane.

7. The turning insert according to claim 1, wherein the nose cutting edge slopes at an angle relative to a plane parallel to the midplane, wherein the angle is in the range of 10 to 30°.

8. The turning insert according to claim 1, wherein the nose cutting edge extends from a first transition point to a second transition point, and wherein the second transition point defines a point being located closest to the midplane.

9. The turning insert according to claim 1, wherein each of the rake surfaces forms an acute angle with a respective side surface.

10. The turning insert according to claim 1, wherein the nose cutting edge is asymmetrically arranged relative to the plane containing the bisector, and wherein the first, trailing, or minor cutting edge is convexly curved when seen in a top view.

11. The turning insert according to claim 1, wherein the top surface includes a first flat surface extending parallel to the midplane, and wherein the turning insert has at least one set of cutting edges in every acute angled corner.

12. The turning insert according to claim 1 wherein a shortest distance from the second transition point of the nose cutting edge to the midplane is less than a shortest distance from the first transition point to the midplane.

13. The turning insert according to claim 1, wherein the turning insert is at least 99% cemented carbide or at least 99% cermet, wherein the rake surface is formed by pressing and sintering.

14. The turning insert according to claim 1, wherein the turning insert in a top view is shaped as a parallelogram or a rhomboid, wherein the turning insert, including the rake surface, is made from cemented carbide or cermet.

15. A turning tool comprising:
    a tool body; and a turning insert according to claim 1, wherein the tool body includes a seat in which the turning insert is mountable, wherein the tool body has a front end, a rear end, and a longitudinal axis intersecting the front and the rear ends, wherein a bisector intersecting a midpoint of the nose cutting edge in a top view forms an angle of 40-50° relative to the longitudinal axis of the tool body.

\* \* \* \* \*